United States Patent [19]

Heffner

[11] 4,033,033

[45] July 5, 1977

[54] BUS MANUFACTURING MECHANISM AND METHOD

[75] Inventor: George R. Heffner, San Diego, Calif.

[73] Assignee: Rohr Industries, Inc., Chula Vista, Calif.

[22] Filed: Feb. 23, 1976

[21] Appl. No.: 660,554

[52] U.S. Cl. .................................. 29/824; 29/469; 269/37

[51] Int. Cl.$^2$ .......................................... B23P 19/04

[58] Field of Search ........ 29/469, 509, 522, 200 R, 29/200 P, 200 A, 200 J, 822, 823, 824; 296/28 R, 28 A, 137 R; 214/392, 394, 396; 269/37, 41

[56] References Cited

UNITED STATES PATENTS

| | | | |
|---|---|---|---|
| 1,877,653 | 9/1932 | Fageol | 29/200 R |
| 3,624,886 | 12/1971 | Powers et al. | 29/200 J |
| 3,673,675 | 7/1972 | Eggert | 29/469 |
| 3,820,216 | 6/1974 | van der Lely | 29/200 A |
| 3,827,137 | 8/1974 | Schubach | 29/469 |
| 3,890,688 | 6/1975 | van der Lely | 29/200 R |
| 3,962,773 | 6/1976 | van der Lely | 29/430 |

Primary Examiner—James R. Duzan

[57] ABSTRACT

A plurality of sub-assemblies comprising elements of a transit vehicle are first completed individually in their respective jigs. Each of selected ones of these sub-assemblies has embodied therein an extrusion having a trackway formed thereon for alignment with a selected conveyor way provided therefor in a collector, which travels in successive cycles along a selected path on a final assembly floor. Each of said selected sub-assemblies has joint means formed thereon for interlocking engagement with complementary joint means provided on one or more of the other sub-assemblies. The selected sub-assemblies are conveyed, by means of their trackways riding along their respective conveyor ways, into the collector, and thus into interlocked relation with each other in positions of final assembly therein, where they are secured permanently in such interlocked relation. Other sub-assemblies are then added to produce a complete transit vehicle.

15 Claims, 19 Drawing Figures

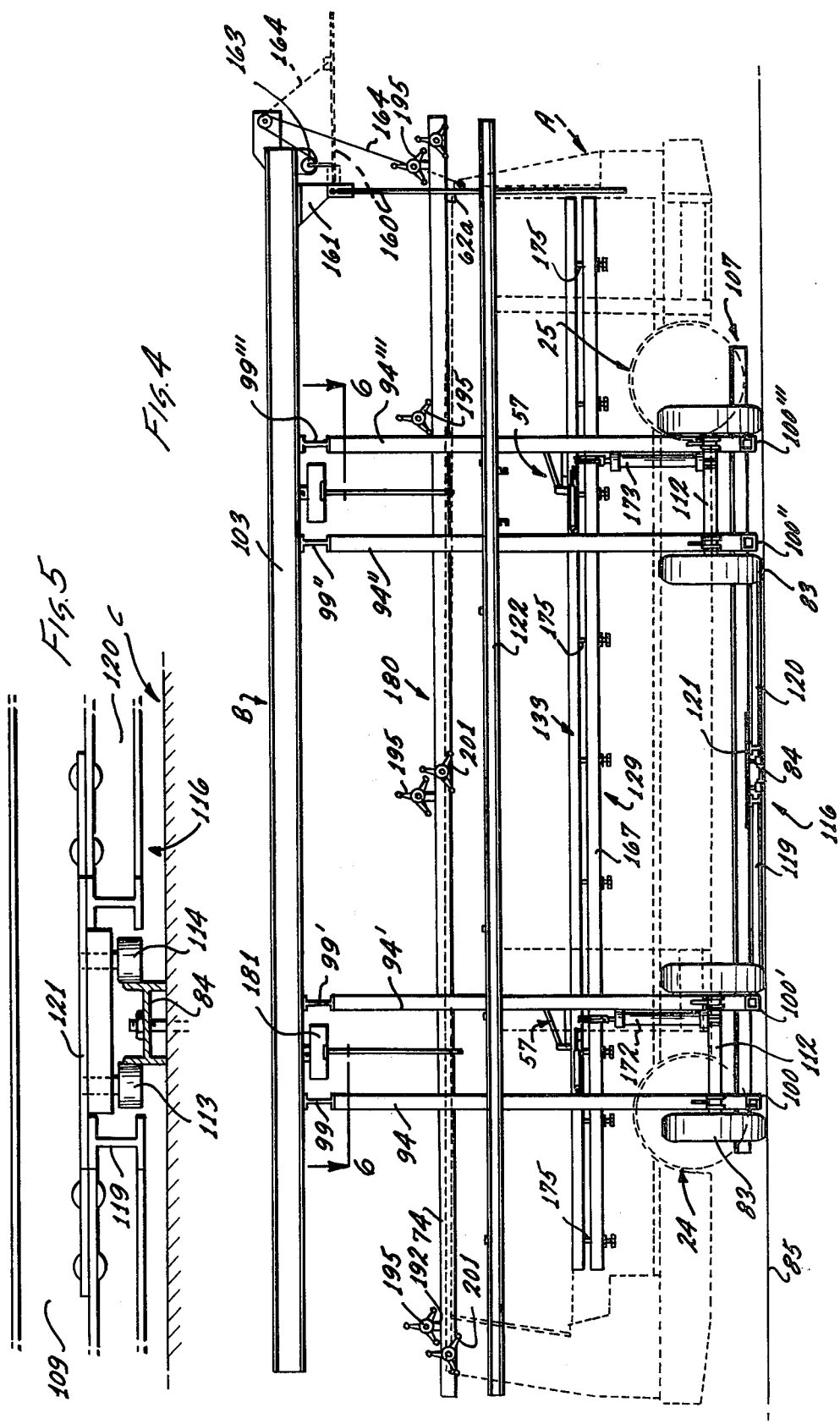

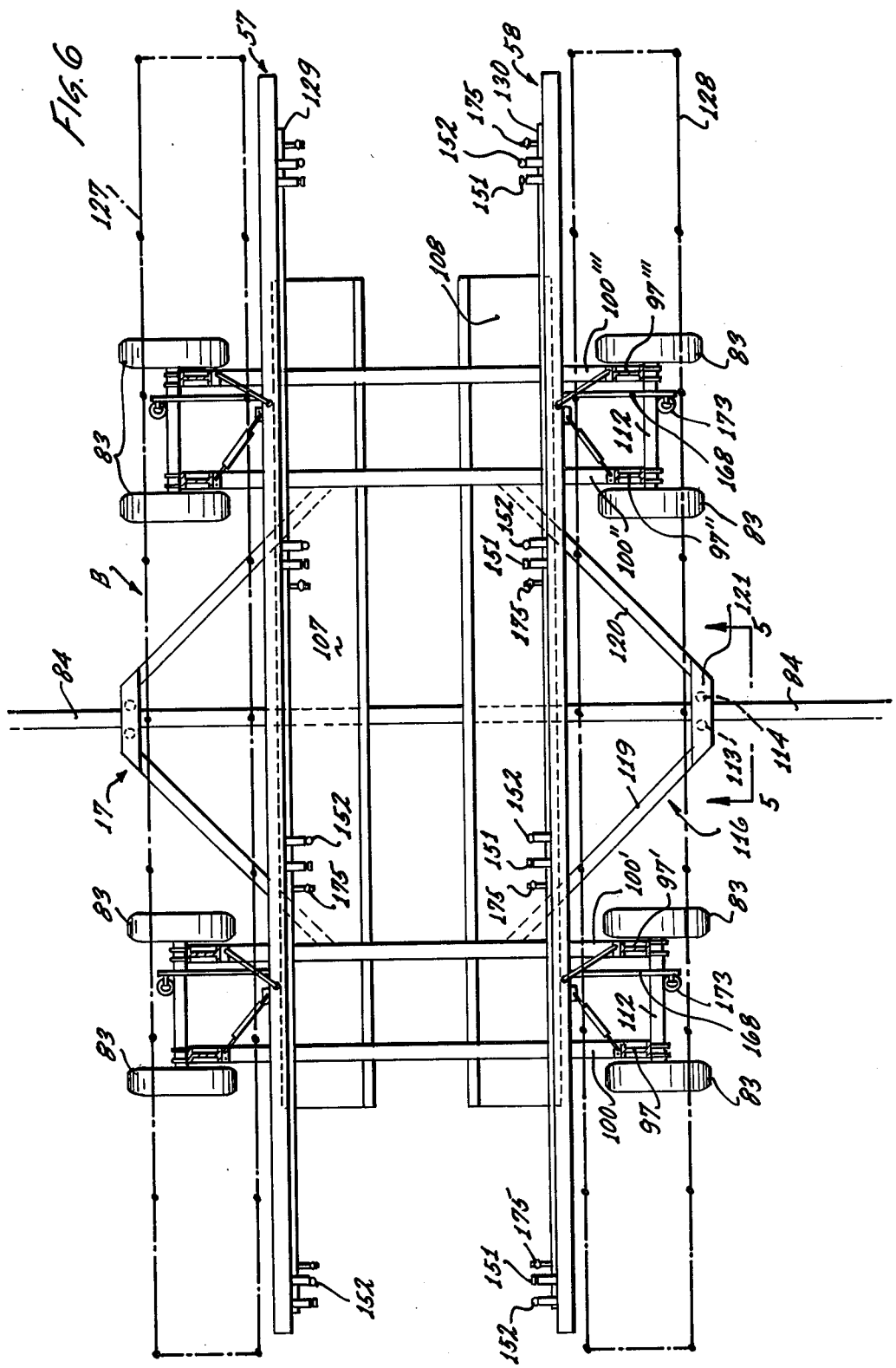

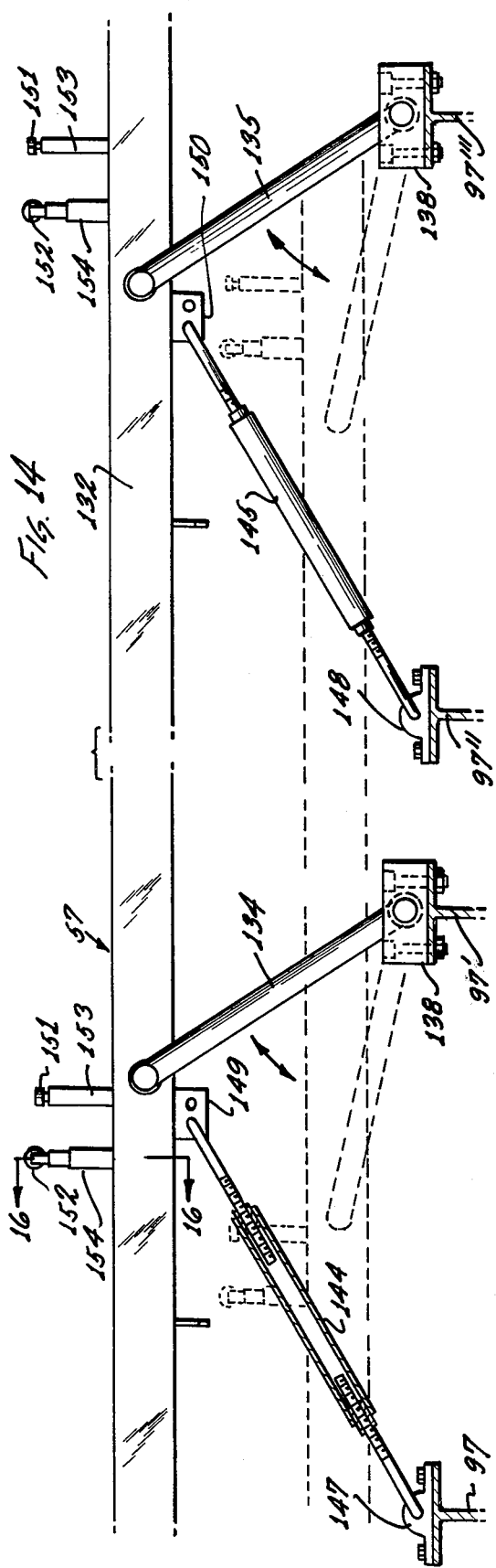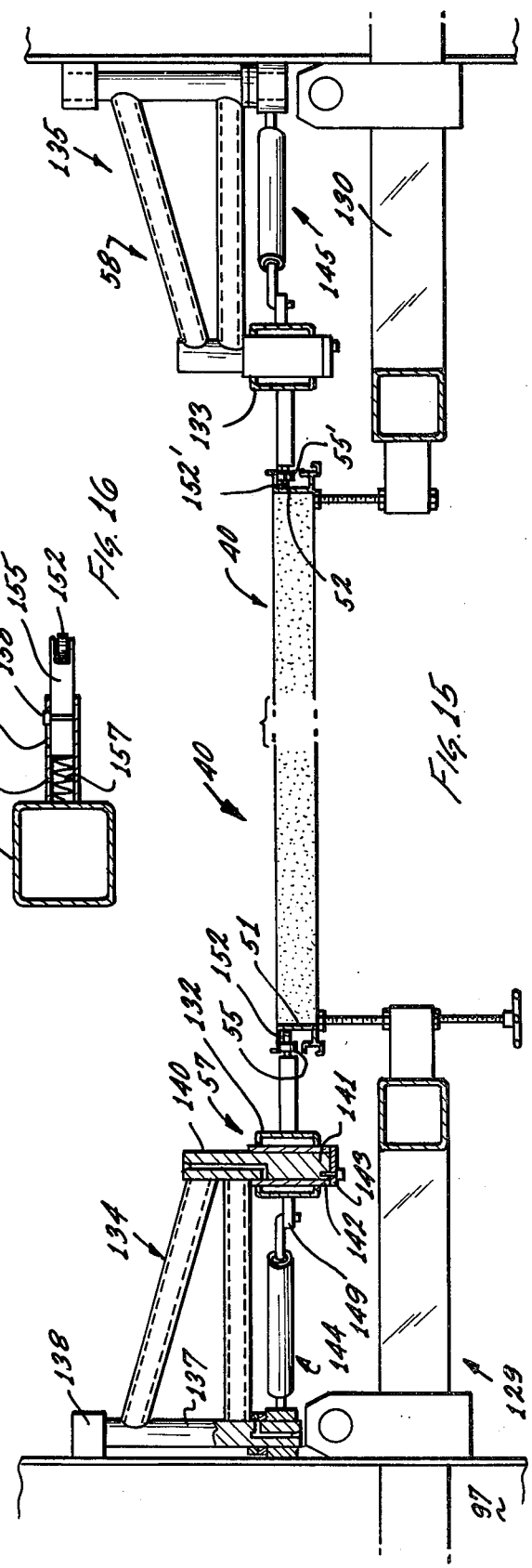

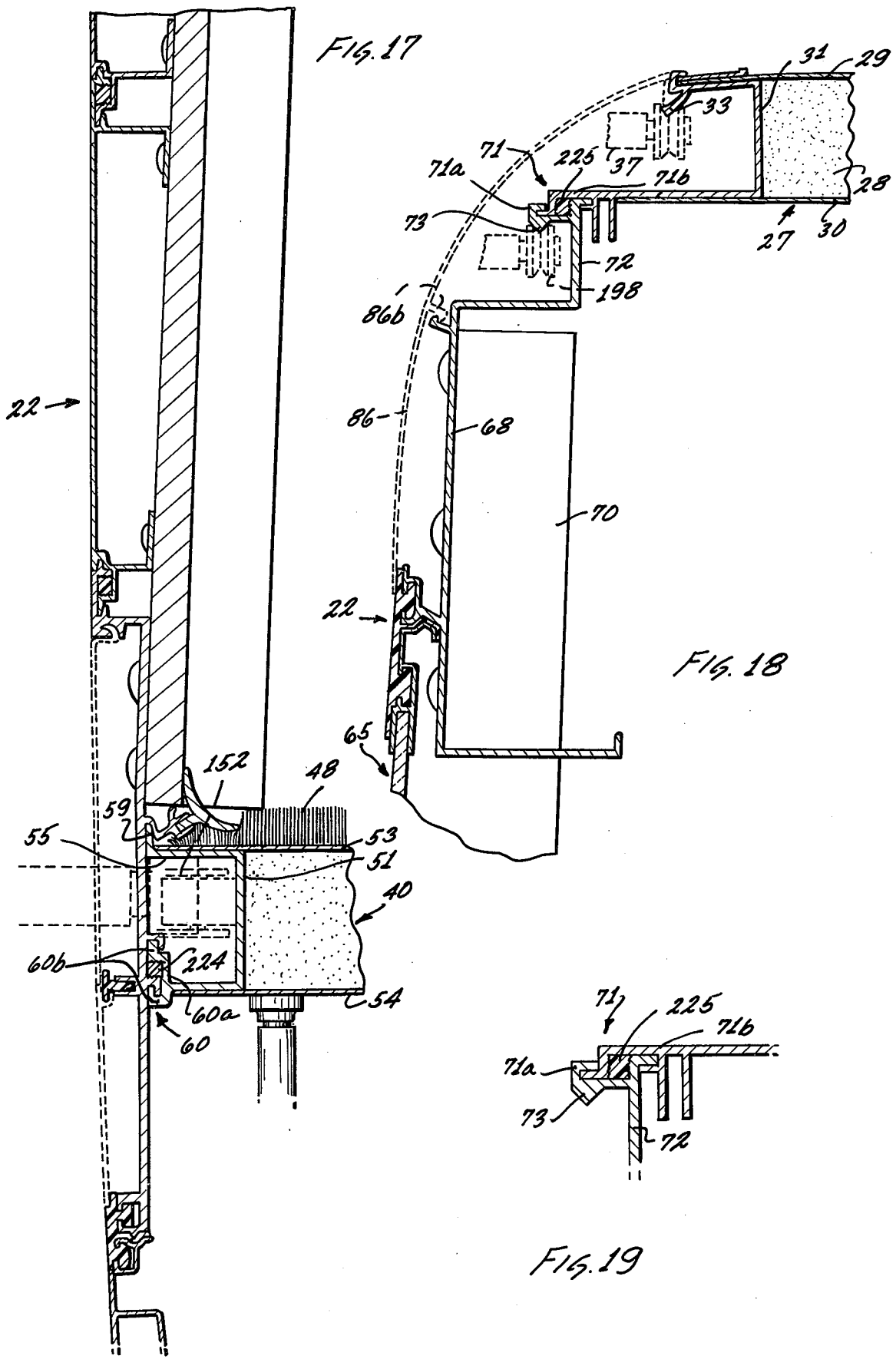

BUS MANUFACTURING MECHANISM AND METHOD

BACKGROUND OF THE INVENTION

Until recently, it has been the general practice in the construction of buses and other transit vehicles, to build them piece-by-piece, wherein a skeleton framework, usually referred to as a "bird-cage," is erected on a vehicle floor structure, after which the vehicle side walls and roof are completed, and then the interior of the vehicle is finished by workers therein, passing the necessary material, such as liners, doors, windows, fixtures, seats, paints, carpeting, etc., in through the door and window openings of the vehicle.

U.S. Pat. No. 3,827,137 to T. C. Schubach, assigned to the assignee of the present invention, discloses and claims a method of manufacturing a transit vehicle by completing, in individual jigs, sub-assemblies of a transit vehicle, including a floor assembly, side wall assemblies, roof assembly, and front end assembly, and then assembling these completed sub-assemblies to provide a substantially completed vehicle.

The present invention is based on that general concept, but goes beyond it in providing a trackway on each of selected ones of the sub-assemblies, and in employing a traveling collector, having a plurality of conveyor ways therein, with each of which is a trackway of one of the selected sub-assemblies is adapted to be aligned. The conveyor ways are so located and adjusted that the selected sub-assemblies are conveyed therealong from their respective jigs into the collector, and into positions of final assembly with each other, where they are secured.

SUMMARY OF THE INVENTION

The invention provides, in combination with a plurality of sub-assemblies comprising elements of a transit vehicle, each of which sub-assemblies has at least one trackway therealong, a traveling collector having conveyor ways therein for registering with such trackways and conveying selected ones of said sub-assemblies into the collector in positions of final assembly, in which positions they are secured together to comprise a substantially completed transit vehicle.

BRIEF DESCRIPTION OF THE DRAWINGS

The objectives and advantages of the invention will be apparent from the following description and the accompaning drawings, wherein:

FIG. 4 is a side, elevational view of the collector the workers ' platform being omitted, and a completed bus being shown in broken lines in the collector.

FIG. 5 is an enlarged, fragmentary, transverse, sectional view, taken along line 5—5 of FIG. 6.

FIG. 6 is a horizontal, sectional view of the collector taken along line 6—6 of FIG. 7, the bus and the floor panel alternate support being omitted, and two working platforms being shown in broken lines.

FIG. 14 is a fragmentary, horizontal, sectional view taken along line 14—14 of FIG. 7, portions being broken away.

FIG. 15 is a fragmentary, vertical, transverse sectional view taken aling line 15—15 of FIG. 6, a bus floor panel being shown supported on the two alternate floor support members of the collector.

FIG. 16 is an enlarged, sectional view taken along line 16—16 of FIG. 14.

FIG. 17 is an enlarged, vertical, transverse sectional view of the juncture area of the floor and side wall structure of the bus shown in FIG. 1, floor panel support and guide rollers being shown in broken lines.

FIG. 18 is a similarly enlarged, cross sectional view of the juncture area of the bus roof and one side wall, a snap-on fairing strip being shown in broken lines as it appears when snapped into place to cover the joint area between these two sub-assemblies, but roof and side wall support and conveying rollers also being shown in broken lines.

FIG. 19 is an enlarged detail showing of the interlocked bus roof-to-side wall joint of FIG. 18.

DETAILED DESCRIPTION OF THE ILLUSTRATIVE FORM OF THE INVENTION

Figure 1:
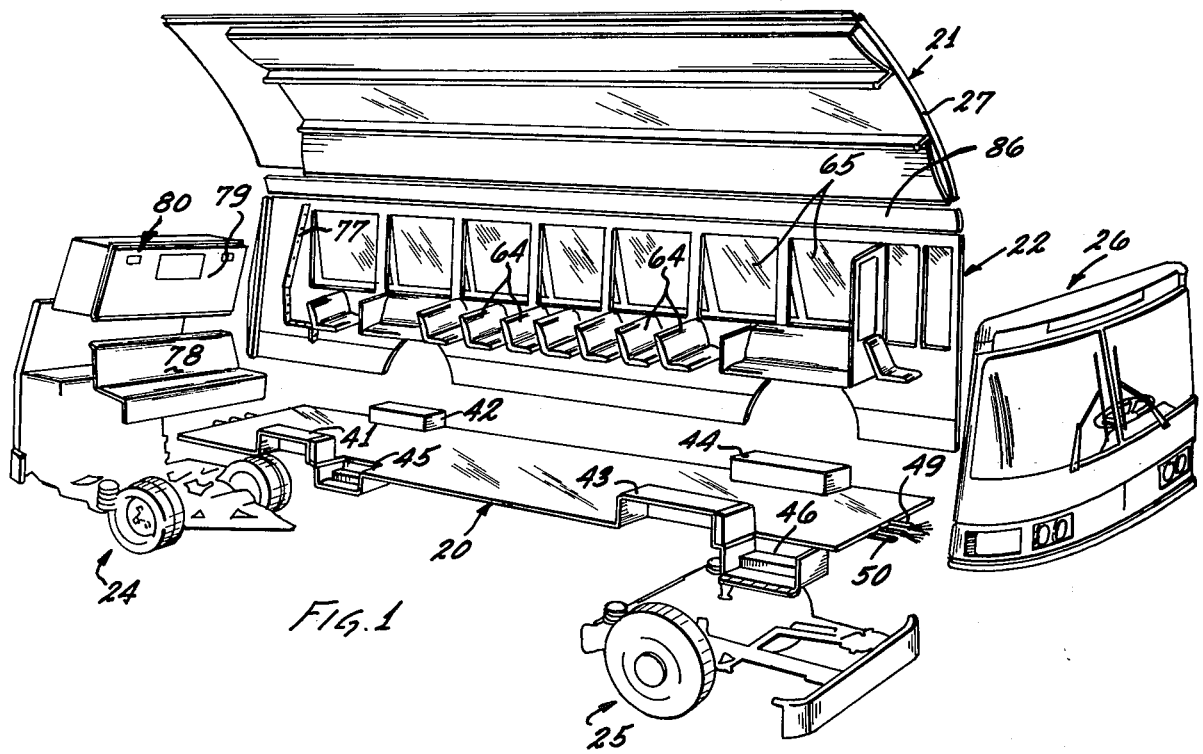
FIG. 1 is an exploded, perspective view of the various individually completed sub-assemblies comprising a transit vehicle, which, for the purpose of the present disclosure, is a bus.
Figure 2:
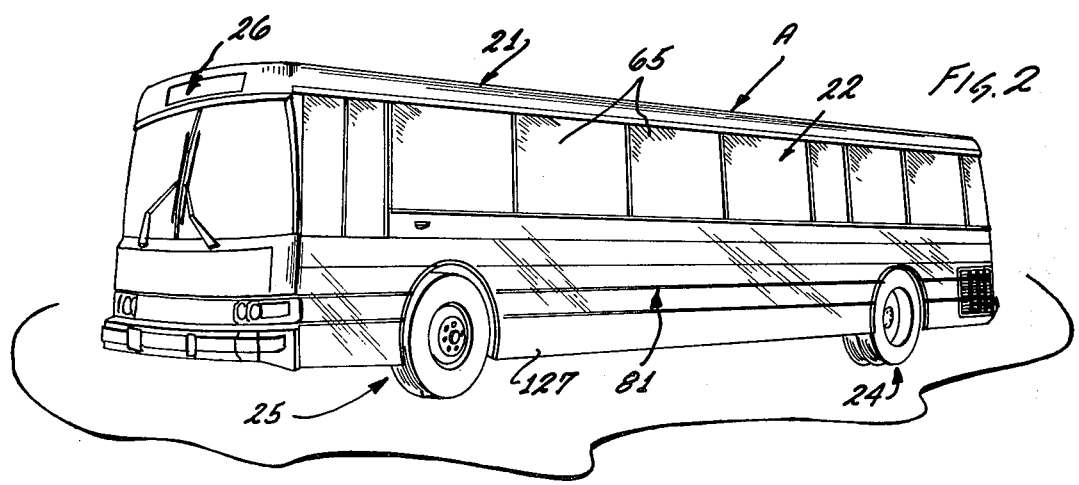
FIG. 2 is a perspective view of the vehicle assembled in accordance with the invention from the sub-assemblies shown in FIG. 1.

Referring to the drawings in detail, an exemplary transit vehicle A, a bus, see FIG. 2, is assembled, in accordance with the present invention, from a plurality of sub-assemblies, see FIG. 1. These sub-assemblies, each of which is completed in its own individual jig, not shown, are conveyed into a traveling collector B, see FIGS. 4, 6 and 7, at selected locations as the collector travels along a selected path on a final assembly floor C, see FIG. 3.

Figure 7:
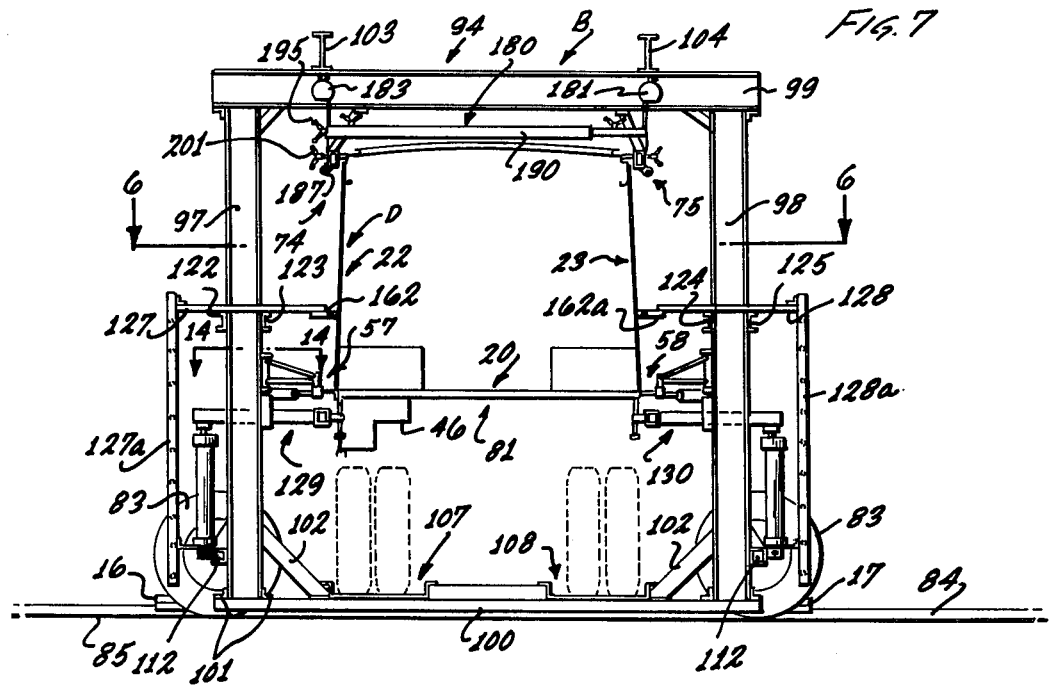
FIG. 7 is an elevational view of the collector shown in FIGS. 4 and 6, the vehicle body being shown therein in its elevated position wherein the side wall are assembled with the floor and roof sub-assemblies, the position of a set of bus rear support wheels being shown in the wheel trackways therebeneath.

The sub-assemblies which are of principal interest with respect to the present invention comprise: a floor sub-assembly 20, see FIGS. 1 and 7, roof sub-assembly 21, two side wall sub-assemblies 22 and 23, rear wheel sub-assembly 24, front wheel sub-assembly 25, and body front end sub-assembly 26.

The roof sub-assembly 21 is assembled in its own individual jig, not illustrated, complete with air conditioning ducts, lighting fixtures, hand assist rail, etc. The roof sub-assembly comprises an arched, sandwich-type roof panel 27, see FIGS. 9 and 13, with a structural plastic foam core 28, and top and bottom metal facing sheets 29 and 30 bonded thereto. The facing sheets 29 and 30 extend laterally slightly beyond the foam core 28 along both sides of the panel 27, and the extending sheet portions on each side receive laterally outwardly open, extruded, aluminum, channel side members 31 and 32, respectively, in fitted relation therebetween. The channel side members 31 and 32 are secured in such position as by bonding or riveting.

Figure 13:
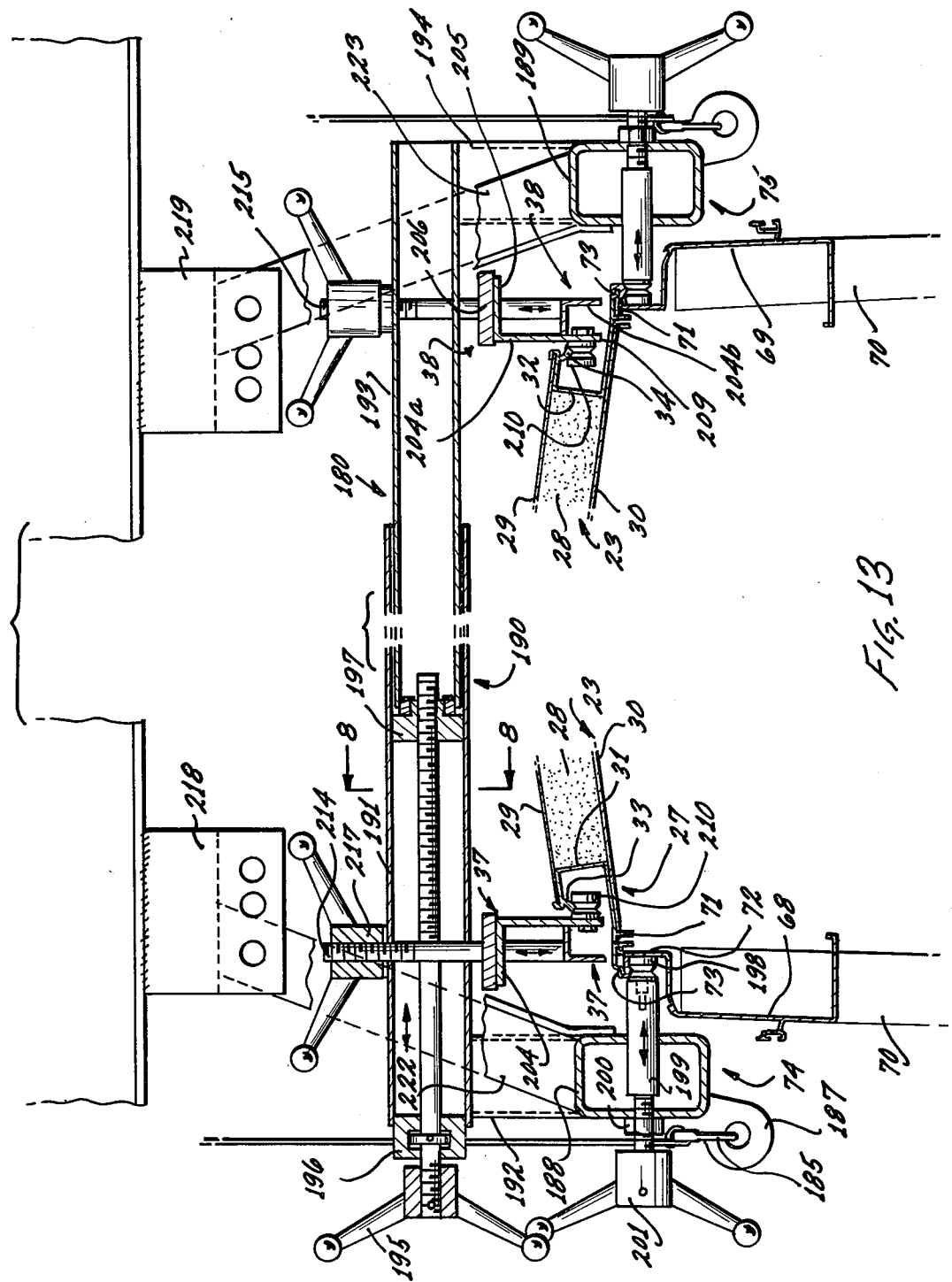
FIG. 13 is a fragmentary, transverse, vertical sectional view of the vertically adjustable roof and side wall conveyor way and support frame taken through one of the adjustable, transverse frame members, portions being broken away.

A pair of downwardly directed, V-shape trackways 33 and 34 are provided, one along the outer edge portion of the upper flange of each of the roof panel side channels 31 and 32. These trackways are adapted to be aligned, selectively, with conveyor ways 37 and 38, see FIGS. 13 and 18, provided in the collector B for conveying a completed roof sub-assembly into the collector in a manner to be described in further detail later herein.

Figure 9:
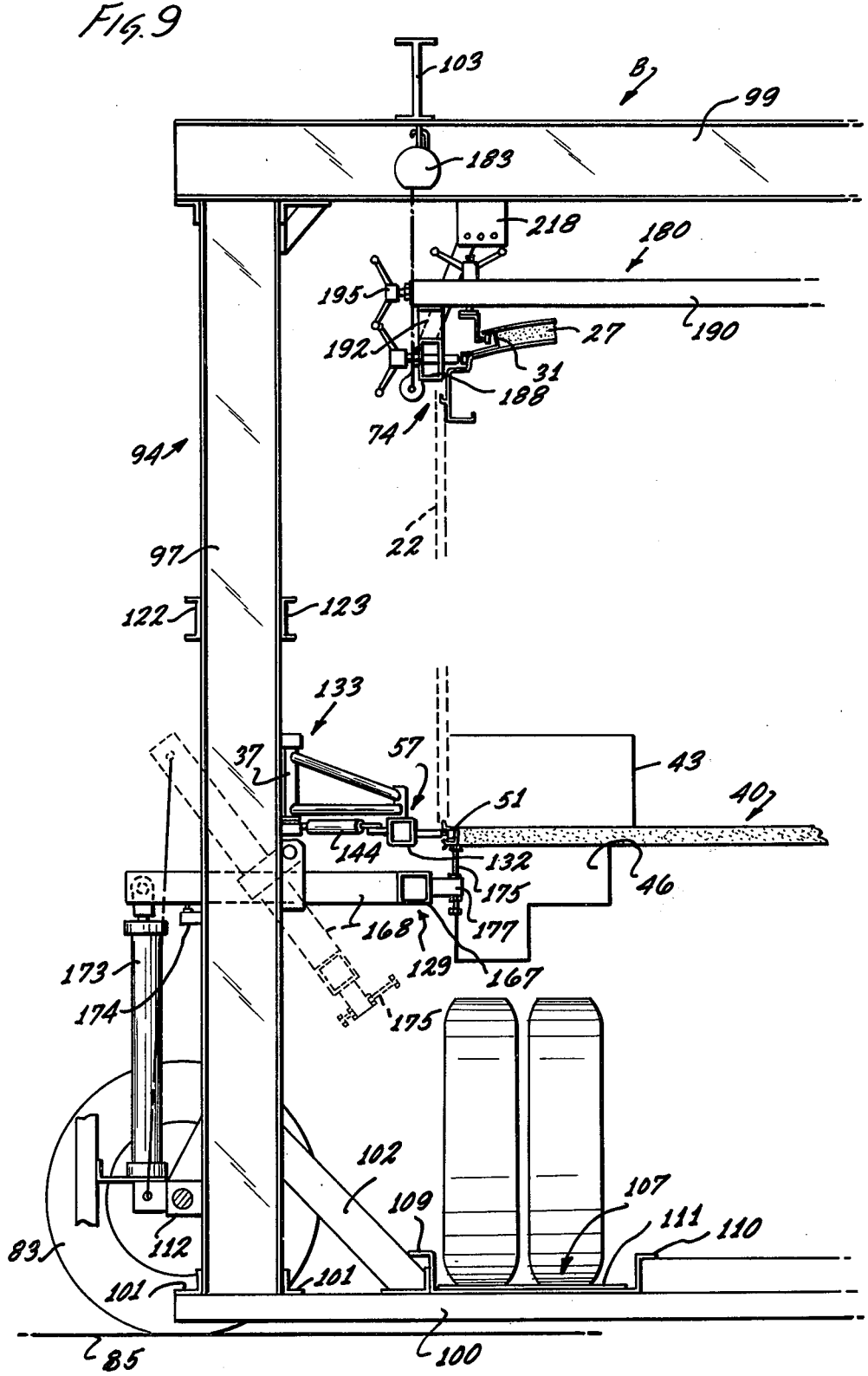
FIG. 9 is an enlarged, fragmentary, end elevational view showing the left hand portion of FIG. 7, one support wheel being removed, and portions broken away.

The bus floor sub-assembly 20 also is assembled to completed, or substantially completed, condition in its own individual jig, not shown, and comprises a sandwich panel 40, see FIGS. 9, 15 and 17, complete with wheel wells 41, 42, 43 and 44, see FIG. 1, and stairwells 45 and 46. The floor panel 40 also is carpeted, as shown at 48 in FIG. 17, or provided with other finished flooring, etc., as required. The illustrative floor panel 40 is structurally quite similar to the roof panel 27, described previously herein, with the exception that the floor panel is flat, and somewhat thicker, the roof panel 27 preferably being of a thickness of the order of two inches, and the illustrative floor panel 40 approximately two and one half inches. The floor panel 40 preferably has one or more conduits 49, see FIG. 1, for electrical wiring, and ducting 50 for fluids, such as compressed air, embedded therein. The floor panel 40, like the roof panel 27, has a pair of outwardly open, extruded aluminum side channels 51 and 52, see FIGS. 15 and 17, fitted between, and secured to, laterally extending portions of top and bottom facing sheets 53 and 54.

A trackway 55, see FIGS. 15 and 17, comprises the flat under side of the upper flange of each of the floor panel side channels 51 and 52, which trackways are supported on conveyor ways 57 and 58 of the collector B.

An upwardly projecting bead 59, best shown in FIG. 17, for interlocking engagement with a recess provided therefor in its respective side wall sub-assembly, is provided along the free edge of the upper flange of each floor panel side channel 51 and 52, and one half portion 60a of a floor-to-side wall interlocking joint 60 is provided along the free edge of the lower flange of each floor panel side channel for interlocking engagement with the other half 60b of the joint, which is formed integral with an extruded element of each side wall sub-assembly. The joint 60 is of the general type disclosed in U.S. Pat. application Ser. No. 594,828, by K. W. Tantlinger, assigned to the assignee of the present invention.

The generally similar side wall sub-assemblies 22 and 23, as illustrated by the side wall 22 in FIG. 1, are assembled in their individual jigs, not shown, complete with cantilever seats 64, windows 65, and usual doors, ducting, wiring, and any other equipment which may be required, such as, for example, door actuating mechanism, not shown, and are painted or otherwise finished as required. The side wall sub-assemblies 22 and 23 have aluminum extrusions, 68 and 69 respectively, see FIGS. 13 and 18, extending lengthwise the full length of the upper portion of each thereof. These side wall extrusions 68 and 69 are similar, but reversed, so only the one 68, best shown in FIG. 18, is described in detail.

The extrusion 68 is of generally channel shape, with its open side facing inwardly. It is fitted and secured to the upper ends of a plurality of upright mullions 70, which are provided at symmetrically spaced intervals between the windows 65 of each side wall sub-assembly. An upwardly extending flange 72 is provided along the inner edge of the upper flange of the extrusion 68, and the upper edge of this upwardly extending flange is formed to provide one half 71a of a roof-to-side wall interlocking joint 71. A trackway 73, in the form of a V-shaped bead, is provided along the outer edge of joint portion 71a, to ride on the rollers of a side wall conveyor 74, see FIGS. 7, 9, 13 and 18, which is one of two side wall conveyor ways 74 and 75, to be described later herein.

A fairing strip 86, see FIG. 1 and broken lines in FIG. 18, is provided to cover the roof-to-side wall joint area on each side of the vehicle A, and is of the general type disclosed in U.S. Pat. No. 3,740,089, assigned to the assignee of the present invention. A curved lip 86a is provided along the upper edge of the fairing strip, and rocks into a curved slot provided along the outer edge of the upper flange of each roof channel extrusion 31 and 32. A hook shape flange 86b extends inwardly along an intermediate portion of the fairing strip 86, and has snap-in, hooked engagement with a similar, but reversed, hook shape flange provided on the side wall upper extrusion 68.

A pair of similar, but reversed, rear seat support flanges, only one of which, 77, is shown, see FIG. 1, are provided in corresponding positions opposite each other on the inner sides of the side wall sub-assemblies 22 and 23. These seat support flanges 77 are shaped to conform to, and to be secured in sealed, supporting relation to, a rear seat 78, which extends across the rear end of the bus passenger compartment. The rear seat 78 also is sealed to the floor sub-assembly 20, and to the lower edge of the forward panel 79 of an air conditioning unit 80, which panel extends from the top of the rear seat 78 to the roof panel 21, and is sealed to the roof panel, thereby completing a sealed wall, which adds structural strength to the bus body and seals the passenger compartment of the bus from an engine compartment provided rearwardly of the wall thus formed.

Figure 3:
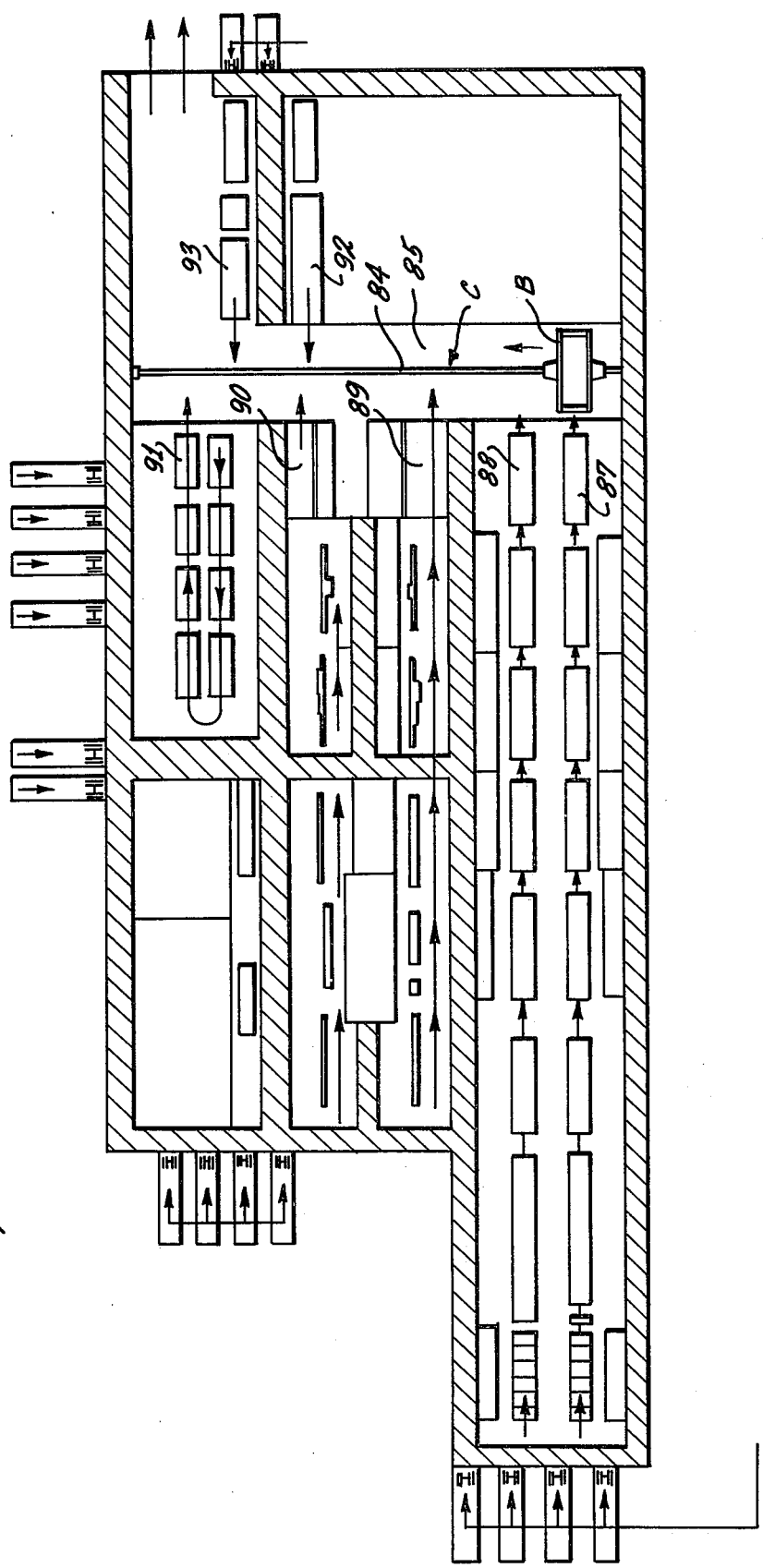
FIG. 3 is a floor plan of an area for building the sub-assemblies and assembling the vehicle in accordance with the invention.
Figure 10:
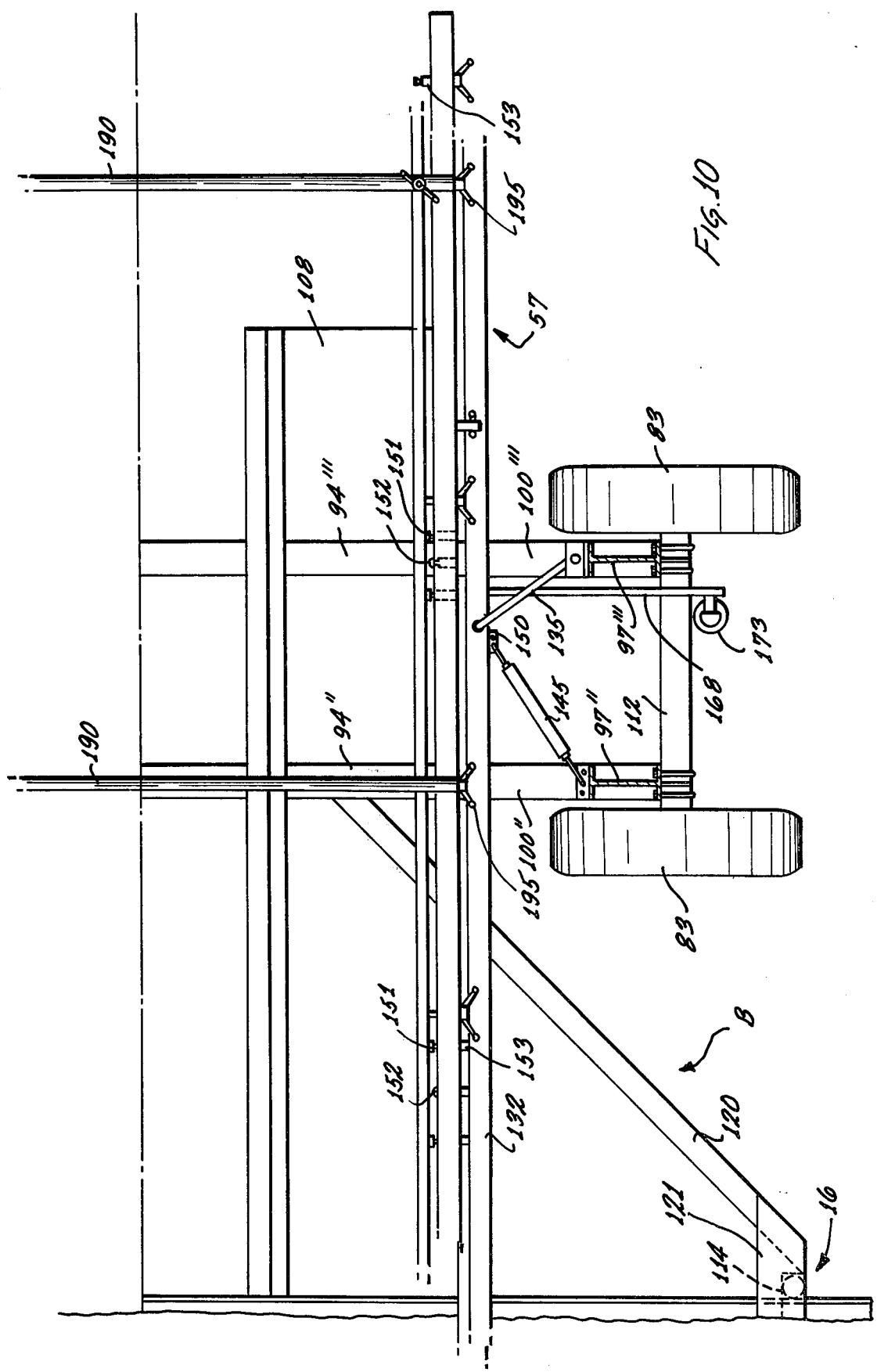
FIG. 10 is a similarly enlarged, fragmentary, top, plan view showing the right hand lower portion of FIG. 6, the workers ' platform being omitted.
Figure 11:
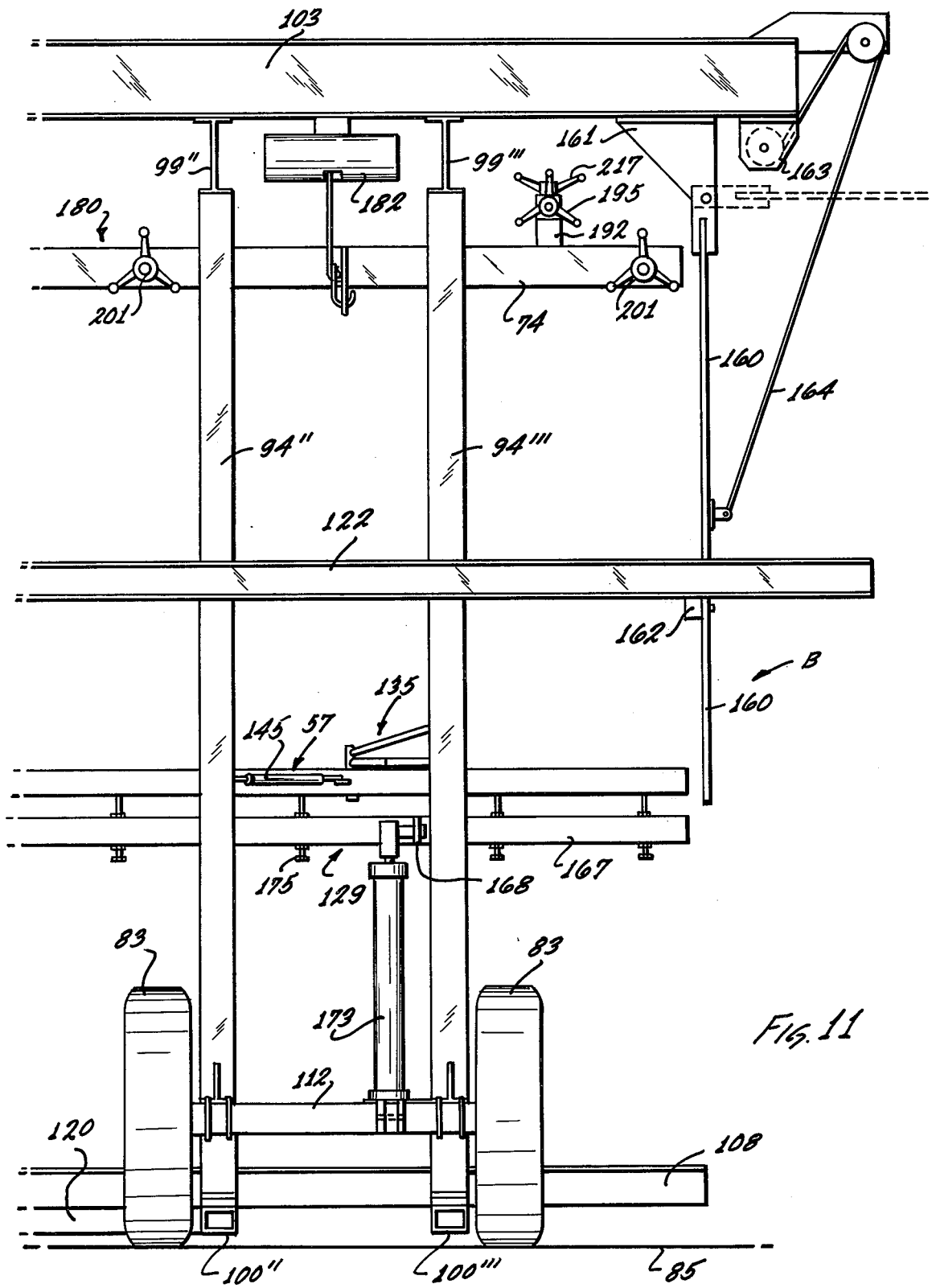
FIG. 11 is a similarly enlarged, side elevational view showing the right hand portion of FIG. 4.

The collector B, shown somewhat diagrammatically in its entirety in FIGS. 4, 5 and 6 and fragmentally in greater detail and on a larger scale in FIGS. 9, 10 and 11, comprises a generally rectangular frame structure, open on at least one end thereof to receive the various sub-assemblies of a transit vehicle to be assembled therein, and is supported by four similar pairs of non-dirigible wheels 83 for travel back and forth, in successive cycles, along a selected path determined by a guide rail 84 secured to a final assembly floor C, see FIG. 3.

The latter figure is a diagrammatic floor plan, which includes not only the final assembly floor C, but also various sub-assembly lines wherein the sub-assemblies referred to herein are completed. The illustrative guide rail 84 is an H-beam, laid on its side and secured to the final assembly area floor, for example, as shown in FIG. 5. The collector B, traveling along the selected path defined by the guide rail 84, moves past the discharge ends of the assembly lines containing the jigs for assembling the various sub-assemblies shown in FIG. 1. These assembly lines comprise, in succession, beginning at the bottom of FIG. 3, a floor sub-assembly line 87, roof sub-assembly line 88, first side wall sub-assembly line 89, second side wall sub-assembly line 90, rear wheel power drive unit sub-assembly area 91, front wheel sub-assembly area 92, and front end sub-assembly area 93.

The details of the various manufacturing steps accomplished in the lines and areas designated by the rectangles, etc., of FIG. 3 are not material to the present invention, it being sufficient to say herein that each sub-assembly is completed in its own individual jig, and arrives at its position adjacent the final assembly floor C with all accessories and equipment installed, and complete or substantially complete.

It will be understood by one familiar with such matters that the actual design of an assembly area, and the making of arrangements for the building of the various sub-assemblies, and their transfer to the collector B, will depend upon various factors, including the structure of a building or buildings, either available or to be built, in which the work is to be accomplished, as well as the design of the particular vehicle or vehicles to be assembled therein. For these reasons, a specific floor plan will, in each instance, be designed in accordance with well known principles, and the floor plan of FIG. 3 is presented as showing one which is presently preferred.

The illustrative collector B comprises four similar, rectangular, transverse, open frames 94, 94', 94'' and 94''', see FIGS. 4, 6 and 7, two of which frames are provided adjacent each end of the collector. Since these frames are all similar, only the one 94 will be described in detail, and corresponding parts of the other frames, where required, will be identified by the same reference numerals with the primes of their respective frames added, as follows: frame 94', single prime ('); frame 94'', double prime (''); frame 94''', triple prime (''').

The transverse frame 94 comprises a pair of similar, upright side beams 97 and 98, a transverse top beam 99, and a transverse bottom beam 100. The side beams 97 and 98 are of suitably strong material, for example, H-section steel beam, one half inch thick, with 12 inch web, and 6 inch flanges. The lower ends of the side beams 97 and 98 are mounted on the transverse bottom beam 100, which is a heavywall box beam approximately 6 inches wide and 4 inches high, and are secured thereto by angle plates 101, see FIGS. 7 and 9, either bolted or welded. The upright side frame beams 97 and 98 also are braced to the horizontal, bottom beam 100 by diagonal steel angle members 102.

The upper ends of the upright side beams 97 and 98 are interconnected by a transverse top beam 99, which may be the same type of H-beam as the upright side beams, and is secured thereto in a suitable or conventional manner, for example as shown in FIG. 9.

A pair of longitudinally extending top beams 103 and 104, are mounted in edgewise upright position across the tops of the transverse top beams 99, 99', 99'' and 99''', and extend the entire length of the collector B, see FIG. 4. They are secured to the top beams 99 as by bolts or welding.

For rolling the bus front and rear wheel sub-assemblies 26 and 24 into the collector B, and for rolling a completed bus A, see FIGS. 2 and 4, out of the collector, a pair of similar, channel wheel tracks 107 and 108 are provided lengthwise of the collector B along the tops of the bottom box beams 100, 100', 100'' and 100'''. Since the wheel tracks 107 and 108 are similar to each other, only the one 107 is described in detail, see FIG. 9.

The wheel track 107 comprises a pair of Z-section steel beams 109 and 110, approximately 6 inches high, with approximately 3 inch flanges, mounted in edgewise upright position longitudinally of the collector on the transverse bottom beams 100, and spaced approximately 18 inches apart. These Z-section beams are mounted with their bottom flanges extending laterally toward each other, and are secured to the bottom box beams by bolts or machine screws. A plurality of steel, track-forming plates 111, of sufficient strength and rigidity to support the buses, are laid in endwise abutting relation across, and supported on, the inwardly extending bottom flanges of the Z-section beams 109 and 110.

The collector B is mounted on four similar pairs of support wheels 83, the wheels of each pair being journaled on opposite ends of a straight axle 112, which is secured transversely across the outer sides of the upright side beams of the two rectangular, transverse collector frames on each end of the collector, and at a height to support the box beam bottom members 100, 100', 100'', and 100''' above a flat supporting surface such as the final assembly floor, and clear of the guide rail 84. All of the support wheels are parallel and non-dirigible, since the collector is designed to move sideways in a substantially straight, selected path along the final assembly floor C under the guidance of the rail 84, which presents its flat sides to two similar pairs of guide rollers mounted on guiding frames 116 and 117, which extend one from each side of the collector B. The guiding frames 116 and 117 are identical, so that only the one 117 is described in detail.

The guiding frame 116 comprises two laterally outwardly converging beams 119 and 120, which are secured to the under side of the laterally outward Z-section beam 109, and their divergent ends to the bottom box beams 100' and 100'', respectively. A pair of guide rollers 113 and 114, see FIG. 5, are journaled on parallel bearing pins which are mounted to extend downwardly from a transverse horizontal plate 121 secured across the tops of the outer, converging ends of frame members 119 and 120. The guide rollers 113 and 114 are spaced apart to receive the guide rail 84 for rolling, guiding movement therebetween.

Two pairs of collector frame reinforcing and working platform support channels 122 and 123, and 124 and 125, see FIGS. 4, 7 9, and 11, of suitable size and strength, extend lengthwise along the outer and inner sides, respectively, of each row of upright side frame members of the collector frames 94, 94', 94'', and 94'''. The reinforcing channels on each side of the collector support conventional working platforms, 127 and 128 respectively, see FIG. 7. These platforms may be of conventional design, the structure of which will be known or obvious to one familiar with transit vehicle construction, and since they are not material to the invention, the details thereof are omitted.

The channels 122–125 are well above the floor conveyor ways 57 and 58, and also above alternate floor supporting means 129 and 130, to be described later herein.

The bus floor sub-assembly conveyor ways 57 and 58 are mounted for lateral deployment and retraction, one along the inner side of each row of collector frame side members 97 and 98. The floor conveyor ways 57 and 58 are similar, but reversed, so that only the one 57 is described in detail.

The latter floor conveyor way comprises a longitudinally extending box beam 133, see FIGS. 4, 7, 9, 14, 15 and 16, approximately 4 inches square and of suitable wall thickness to provide the strength and stiffness required, and is of a length approximating that of a bus floor sub-assembly 20 to be conveyed therealong into the collector. The box beam 133, as best shown in FIGS. 14 and 15, is pivotally connected to the shorter, inner ends of two similar, trapezoidal, swing-out support frames 134 and 135, only the one 134 of which is described in detail.

The trapezoidal support frame 134 has its longer parallel side 137, see FIG. 15, pivoted to swing about a vertical axis in bearing blocks 138 and 139, which are secured to the inner flange of the collector frame side beam 97″. The shorter parallel side 140 of the frame 134 has a downwardly directed pivot pin 141 projecting coaxially from its lower end, see FIG. 15, which pin is journaled in a bearing sleeve 142 extending vertically through, and welded to, the box beam 134. An end plate 143 is secured by machine screws to the lower end of the pivot pin 141, and overlaps the lower end of the bearing sleeve 142 to support the box beam 133.

Figure 12:
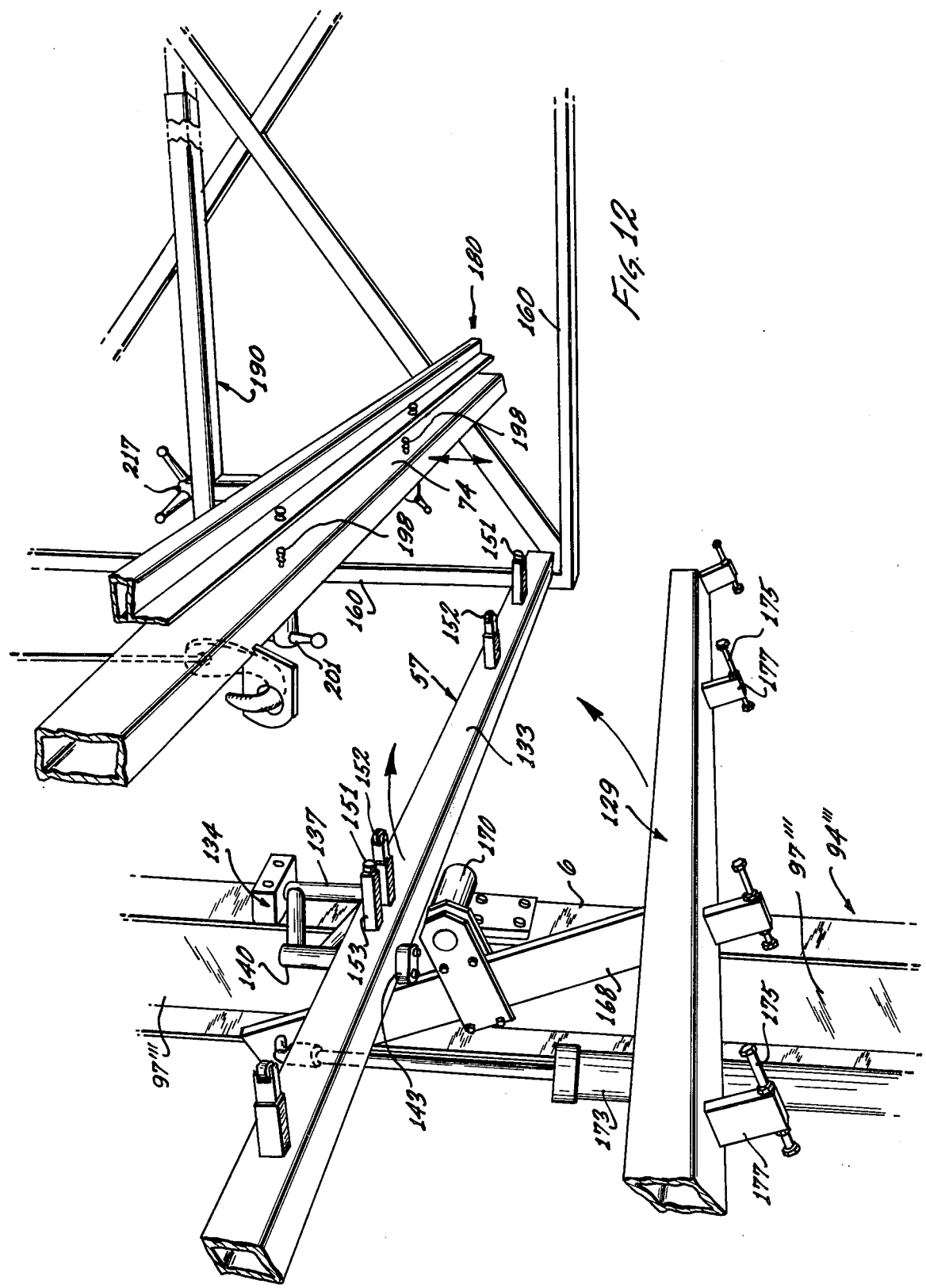
FIG. 12 is an enlarged, fragmentary, perspective view of a portion of the collector as it would appear to a viewer standing inside the portion thereof shown in FIG. 11 and looking toward the right.

The bearing sleeves are so spaced apart in the box beam 133 that the trapezoidal frames 134 and 135 swing in parallel about the axes of their longer parallel sides to allow the box beam 133 to be swung along a substantially horizontal plane between laterally outswung, retracted position, away from the center of the collector B, as shown in FIG. 12 and in broken lines in FIG. 14, and laterally inswung, deployed position, toward the center of the collector, as shown in FIGS. 7, 9, 10, 11 and in solid lines in FIG. 14. Drop-in anchor and adjustment links 144 and 145, with conventional turnbuckle type axial adjustment, are provided with short end portions bent at right angles, one of which end portions of each link is inserted, respectively, in a selected hole in brackets 147 and 148 mounted on the upright frame side members 97′ and 97‴, while the other ends of these links are inserted in holes provided in two plates 149 and 150, welded to the box beam 133 for anchoring the latter in adjusted, deployed position.

A plurality of aligned, floor sub-assembly conveyor way support rollers 151, and spring biased guide rollers 152, are mounted in selected, relatively interposed, spaced relation along the inwardly facing side of the box beam 133, as best shown in FIGS. 14 and 15. Each support roller 151, which may be a suitable ball bearing, is mounted rotatably on a pivot pin extending coaxially from the inner end of a support standard 153, the other end of which standard is welded to the laterally inward face of the box beam 133. The support rollers 151 are adapted to have rolling, supporting engagement with the trackway 55 along the under surface of the upper flange, see FIGS. 15 and 17, of the floor sub-assembly side channel extrusion 51.

Each spring biased guide roller 152, shown in detail in FIG. 16, comprises a base portion 154 of square steel tubing, welded to project laterally inwardly from the upright inward face of the box beam 133, and is axially parallel to, and interposed between, selected ones of the support roller standards 153. A short length 155 of smaller, rectangular tubing is fitted into each base portion 154 for telescoping movement therein, and is biased in extension by a coil spring 157, mounted under compression in each base portion 154.

A limit stop screw 158, screwed into a threaded hole provided in the smaller tube 155, and sliding in a slot 159 in the tubular base portion 154, limits biased extension of the inner tube portion. A guide roller, which may be a ball bearing, is journaled for rotation about an upright axis in the bifurcated, inwardly directed end of each smaller tube 155. Thus, when the floor conveyor ways 127 and 128 are swung inwardly on their trapezoidal frames to their inwardly deployed positions, and are so adjusted by means of their anchor links that their spring-biased guide rollers 152 are spaced apart by the width between the upright bottoms of the channel side extrusions 51 and 52 of a bus floor sub-assembly 20, as shown in FIG. 15, such floor sub-assembly, when supported on the conveyor way rollers 151 is retained in centered position thereon by the guide rollers 152 as it is conveyed into the collector B.

For limiting the travel of the floor sub-assembly 20 along the conveyor ways 57 and 58, and also that of the side wall sub-assemblies 22 and 23 and roof sub-assembly 21, to positions wherein all four of these sub-assemblies are properly aligned in positions of final assembly in the collector for securing together in relatively interlocked condition, a swing-up type arresting frame 160, see FIGS. 4, 11 and 12, is hingedly mounted on a pair of depending brackets 161, one of which is welded to each of the longitudinal top beams 103 amd 104 at the opposite end of the collector B from that through which the floor, side wall and roof sub-assemblies enter the collector. This arresting frame 160 is of suitable construction to define a flat surface, and as illustrated in FIG. 12, is of welded, square tubing. The hinge axis of the arresting frame 160 extends transversely of the collector B, and the frame is releasably retained in vertical, downswung position by bolting it to a pair of stop plates 162, see FIG. 11, one of which is mounted to extend laterally inwardly from each of the working platforms 127 and 128.

A winch 163, see FIGS. 4 and 11, for raising and lowering the arresting frame 160, is mounted on the under side of each of the longitudinal top beams 103 and 104, and a cable 164, wound on each winch drum, is attached to the stop frame 160 for swinging it up out of the way after the floor, side wall and roof sub-assemblies have been conveyed into the collector and interlocked in their condition of final assembly.

In order to clear the sides of a floor sub-assembly 20 for connecting the side wall assemblies 22 and 23 thereto after the floor sub-assembly 20 has been conveyed into the collector B, and its leading end is in arrested position against the arresting frame 160, the alternate floor sub-assembly support means 129 and 130 are swung upwardly and inwardly to floor supporting position. These alternate floor sub-assembly support means 129 and 130 are similar, so that only the one 129, see FIGS. 7, 9, 11, 12 and 15, is described in detail.

A steel box beam 167, of suitable size and strength, is secured, as by welding, to the lower, inner ends of two similar, walking-beam-type lever arms 168 and 169, see FIG. 9, which are pivotally mounted to swing about a common horizontal axis, on similar bearing supports 170, see FIG. 12. The bearing supports are secured to the inner flanges of upright frame side beam 94' and 94''', and the other ends of the lever arms extend outwardly beyond their mounting pivots as best shown in FIGS. 7, 9, 12 and 15. The outer end of the lever arms 168 and 169 are pivotally connected to the piston rods of hydraulic cylinders 172 and 173, respectively, while the lower ends of the hydraulic cylinders are pivotally connected to the axles of their respective support wheel assemblies.

The hydraulic cylinders 172 and 173 are operatively connected, through conventional hydraulic control means, not shown, to a usual supply of pressurized hydraulic fluid, also not shown, to swing the inner ends of the lever arms 168 and 169, and the box beam 167 carried thereby, between retracted, downswung position, as shown in broken lines in FIG. 9, and in solid lines in FIG. 12, and upswung, deployed, floor-sub-assembly-supporting position as shown in FIGS. 7 and 15, and in solid lines in FIG. 9.

Suitable stop means, for example, one or more micro-switches 174, see FIG. 9, controlling the hydraulic system of the cylinders 172 and 173, preferably is provided to limit the actuated position of the alternate floor support members 129 and 130.

A plurality of floor support screws 175 are threadedly mounted, one in the free end of each of a plurality of short blocks 177, the bases of which are welded, at selected, spaced intervals, along the inner side of the box beam 167. These floor sub-assembly support screws 175 are substantially upright when the alternate floor support members are deployed, and may be threadedly adjusted to support a floor sub-assembly 20 at a height above the lever arms 168 and 169 sufficient to allow the lower edges of the side wall sub-assemblies, see FIG. 7, to clear the lever arms when the latter sub-assemblies are conveyed into the collector B along the conveyor ways 74 and 75.

After the alternate floor support means 129 and 130 have been deployed into supporting engagement with a floor sub-assembly 20, the anchor links 144 and 145 are released, and the floor sub-assembly conveyor ways 57 and 58 are swung laterally outwardly on their trapezoidal frames to their retracted position as shown in FIG. 12 and in broken lines in FIG. 14.

A vertically adjustable roof and side wall support frame 180, see FIGS. 4, 7, 9, 12 and 13, which incorporates the conveyor ways 37 and 38 for the roof sub-assembly and those 74 and 75 for the side wall sub-assemblies, is suspended substantially horizontally from the longitudinal top beams 103 and 104 of the collector B by four similar chain hoists, only 181, 182 and 183 being shown. The hoist cable of each of these hoists has a hook 185, see FIGS. 12 and 13, attached to its free end, and each of said hooks has hooked engagement with an eye bracket 187, two of which brackets are provided on the outer side, and near opposite ends of, each of two longitudinal side beams 188 and 189 of the support frame 180. The chain hoists preferably are all operated electrically, and are controlled by conventional control switch means, not shown, for operation either simultaneously, or for indvidual adjustment, as required.

The two side beams 188 and 189 are heavy wall box beams, approximately 3 inches wide, 6 inches high, and ⅜ inch wall thickness, and are adjusted and maintained in accurately spaced, edgewise upright position by a selected plurality of longitudinally adjustable cross members, similar to the member 190, see FIGS. 7 and 13.

Figure 8:
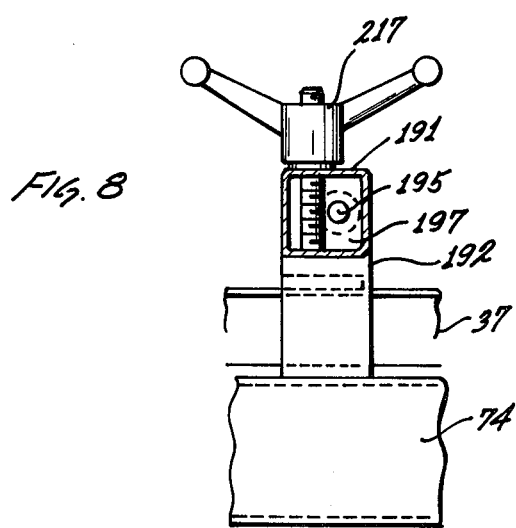
FIG. 8 is an enlarged, fragmentary, sectional view taken along line 8—8 of FIG. 13.

The cross member 190, see FIG. 13, comprises a length 191 of square steel tubing of adequate size and strength, one end of which is welded to the upper end of a short upright post 192, the lower end of which post is mounted on, and welded to, the upper edge of side beam 188. The free end of a second square steel tube 193, smaller than the tube 191, is inserted telescopically into the free end of the tube 191, and the other end of the smaller tube 193 is welded to the top of a short post 194, generally similar to the post 192. The second post 194 is mounted on, and welded to, the upper edge of the other frame side beam 189. For adjustment of the separation between the side beams 188 and 189, a hand screw 195, see FIGS. 8, 9 and 13, is fitted rotatably, and retained against relative axial movement, in a hole provided therefor in a plug 196, fitted into and welded to the laterally outward end of the larger square tube 191. This screw 195 projects into the larger square tube 191, and is screwed into an internally threaded plug 197 fitted into, and secured to, the telescopically inserted end of the smaller tube 193. As shown in FIG. 8, the hand screw 195 is offset laterally from a vertical hand screw to be referred to later herein.

The side wall conveyor ways 74 and 75 each comprise a plurality of similar, aligned, V-groove side wall support rollers 198, best shown in FIGS. 12 and 13, which are provided along the laterally inward side of each of the side beams 188 and 189. Each roller 198, see FIG. 13, may comprise a V-groove ball bearing journaled co-axially on the laterally inwardly directed end of an axially adjustable pin 199, an unthreaded portion of which fits rotatably in a hole provided in the inner wall of the side beam 188. The outer end portion of each pin 199 is of reduced diameter and threaded, and is screwed into a nut 200 welded over a hole provided in the outer wall of the side beam 188. A hand screw handle 201 is secured co-axially onto the pin and the side wall support roller journaled thereon.

The roof conveyor ways 37 and 38 comprise a pair of sub-frame beams 204 and 205 mounted to depend, in vertically adjusted relation, from selected ones of the adjustable frame cross members 190. These sub-frame beams 204 and 205 are similar, but reversed, so that only the one 205 is described in detail herein.

The sub-frame beam 205 is a composite structure, consisting of a larger steel angle member 204a, and a smaller steel angle member 204b, welded together as shown to form the single beam 204, with a depending flange portion 209, and a reinforcing strip 206 welded in place along the top thereof. A plurality of roof sub-assembly support and conveying rollers 210 are mounted at suitably spaced intervals, for example, four feet, and in alignment with each other lengthwise along the depending flange 209. Each roof support roller 210 may comprise a V-groove ball bearing, and is journaled on a pin having a reduced, threaded opposite end portion which is fitted into a hole provided therefor in the depending flange 209, and secured therein by a nut screwed onto such reduced, threaded portion.

For vertical adjustment of the sub-frame beam 204 relative to the side wall support rollers 198, a rod 214, having a threaded upper end portion, is fitted for axial adjustment through vertically aligned holes provided therefor in the upper and lower side walls of each of a selected plurality of the outer telescoped square tubes 191. The lower end portion of each rod 214 is inserted in fitted relation into a hole provided therefor in the combined top plate and underlying flange of its associated sub-frame beam, while the lower end of the rod 214 bears on a horizontal flange of such beam and is welded thereto. A hand screw nut 217 is screwed onto the upper end of each rod 214 and bears on the cross member tube 191 for support and vertical adjustment of its sub-frame beam. Support and adjustment screws 215 for the other sub-frame beam 205 are similarly mounted in the smaller telescopic tubes 193, see FIG. 13, of the selected, adjustable transverse frame members 190.

For securing the vertically adjustable side wall and top sub-assembly support frame 180 fixedly in position during final assembly of the floor, side wall and roof sub-assemblies, and to prevent any swaying which might occur if the top frame were to remain supported solely by its chain hoists during such final assembly, two support flanges 218 and 219, best shown in FIG. 13, which may be of ⅜ inch thick steel plate, are welded to extend downwardly from selected ones of the transverse top frame members 99-99'''.

Welded to each of the longitudinal side beams 188 and 189 of the vertically adjustable frame 180, and extending convergently upwardly therefrom, are two steel angle members 222 and 223, which are so shaped and located as to bring their upper ends closely adjacent the support flanges 218 and 219 when the frame 180 is elevated to selected position as shown in FIGS. 7, 9 and 13. Holes are drilled through the flanges 218 and 219 and their associated angle members 222 and 223 to receive support bolts, not shown, to retain the support frame 180 fixedly in such elevated position. Before drilling the holes for such bolts, however, the separation between the side beams 188 and 189 is adjusted by means of the cross member adjusting screws 195 to a width which will allow the roof support rollers 210 to conform with the trackways 33 and 34 of a roof sub-assembly 21 to be carried thereby.

OPERATION OF THE ILLUSTRATIVE FORM OF THE INVENTION

Assume that a collector B embodying the invention is stationed at the beginning of a final assembly cycle at the bottom of the final assembly floor C, as shown in FIG. 3, and travels in successive stages from one sub-assembly line to the next along its selected path, guided by the guide rail 84. The various sub-assemblies arrive at the ends of their respective assembly lines adjacent the final assembly floor C, having been completed in their individual jigs as described previously herein, and preferably are mounted on suitable means for transferring them onto their respective conveyor ways in the collector B. Such mounting means are not a part of the present invention, but may be similar to the conveyor ways of the collector B as illustrated and described herein.

Proceeding now with the final assembly of a bus in the collector B, assume that the collector is empty, with its alternate floor support members 129 and 130 in downwardly and outwardly swung, retracted position, as shown in FIG. 12, and in broken lines in FIG. 9, and its floor conveyor ways 67 and 58 in laterally inwardly swung, deployed position as shown in FIGS. 9 and 15. With the vertically adjustable roof and side wall support frame 180 raised above and clear of the floor conveyor ways 157 and 158, the collector B is moved along its selected path into alignment with the floor sub-assembly line 87, and with a completed floor sub-assembly 20 at the discharge end of such line.

The conveyor ways 57 and 58 for receiving such completed floor sub-assembly 20 are adjusted, if necessary, by means of their turnbuckle type anchor links 144 and 145, so that the guide rollers 152 and 152', in their normal, extended condition, are separated by approximately the width between the upright bottoms of the side channels 51 and 52 of such floor sub-assembly. The trackways 55 and 55', see FIG. 15, of the completed floor sub-assembly 20 and the support rollers of the conveyor ways 57 and 58 of the collector B are then brought into alignment with the side channels 51 and 52 and the floor sub-assembly is rolled along these conveyor ways into the collector, being guided to centered position thereon by the guide rollers 151 and 151', until the floor sub-assembly is arrested, in its position of final assembly, by engagement with the arresting frame 160.

The hydraulic cylinders 172 and 173 are then energized to swing the alternate floor support members 129 and 130 inwardly and upwardly to floor supporting position as shown in FIGS. 7 and 15, and in solid lines in FIG. 9, after which the floor conveyor way anchor links 144 and 145 are released, and the floor conveyor ways 57 and 58 are swung laterally outwardly on their trapezoidal frames 134 and 135 to retracted position.

The collector B is then moved along its selected path, guided by the guide rail 84, into register with the roof sub-assembly line 88 and with a completed roof sub-assembly 21 at the discharge end thereof. The roof conveyor ways 37 and 38 are then adjusted if necessary, by means of the transverse frame members 190, so that the separation between the roof support rollers 210 on opposite sub-frame beams 204 and 205 is equal to that of the trackways 33 and 34 of such roof sub-assembly. The roof trackways 33 and 34 are then brought into alignment with the roof support rollers 210 and the roof sub-assembly 21 is rolled along the roof conveyor ways 37 and 38 into the collector B until it is arrested by the arresting frame 164.

The roof and side wall sub-assembly support frame 180 is elevated by the chain hoists 181-184 to bring the holes in the converging support members 222 and 223 into register with selected holes in the depending flanges 218 and 219, at which point bolts are inserted into the registering holes in these members to anchor the support frame 180 in its fixed, elevated position.

The collector B is then moved along its selected path into alignment with the first side wall assembly line 89, which is assumed to be that for the side wall sub-assembly 22, see FIGS. 1 and 7. Any necessary adjustments are made to bring the side wall support rollers 198 into alignment with the trackway 73 of such completed side wall sub-assembly, and insure that the roof, floor and side wall sub-assemblies are in proper relative positions to complete the joints therebetween.

Such alignment is accomplished by means of the hand screws 217 for vertical adjustment of the sub-frame beams 204 and 205 of the roof sub-assembly conveyor ways, and the hand screws 201 for adjustment of the side frame conveyor way rollers 198.

In addition to adjustment of the roof and side wall conveyor ways to insure that the joints for interconnecting these members enter into proper interengaged relation with each other as the side wall is conveyed into the collector along its respective side wall conveyor way, it is also necessary to adjust the height of the floor sub-assembly 20 by means of the supporting screws 175 to bring into register with each other the portions 60a and 60b of the joint 60 which connects the floor sub-assembly to each wall sub-assembly, as will be apparent from FIGS. 17 and 18.

With the roof and side wall conveyor ways and the floor support screws thus adjusted, the completed side wall sub-assembly 21 is advanced along its conveyor way 74 into the collector B until it is arrested by the arresting frame 160.

The collector B is then moved along its selected path into alignment with the other side wall assembly line 90, and a completed side wall assembly 23 therein, where the process described for conveying the first side wall sub-assembly into the collector is repeated.

After checking to insure that the side wall-to-roof joints and the floor-to-side wall joints are all properly interfitted, the floor sub-assembly 20 is elevated slightly relative to the side wall sub-assemblies 22 and 23, as by means of the hydraulic cylinders 172 and 173, to move the floor mounted portion 60a of the floor-to-side wall joint 60 up into interlocking engagement with the wall mounted portion 60b. At the same time this movement of the floor sub-assembly seats the upwardly directed beads 59, best shown in FIG. 17, in their respective side wall recesses. Also, the upper ends of the side wall sub-assemblies 21 and 22 are forced laterally inwardly toward each other by a few turns of the hand screws 201, see FIGS. 18 and 19, to fully seat the interlocking parts 71a and 71b of the side wall-to-roof joints 71.

It will be noted in FIG. 17, that as the floor sub-assembly 20 is elevated to seat each bead 59 in its side wall recess, and simultaneously to complete the interlock of the floor-to-side wall joints 60, a passage 224 is opened within the joint in the manner of the joint disclosed in U.S. Pat. application Ser. No. 594,828 mentioned previously herein. Similarly, when the upper ends of the side walls 21 and 22 are moved inwardly to complete the interlock of the side wall-to-roof joints 71, a similar passage 225, see FIG. 18, is opened within each of these joints. These joint passages 224 and 225 are then filled with pressurized, flowable, hardenable material, for example, an activated epoxy type resin, and the filler material is hardened, for example, by allowing the passage of a sufficient lapse of time, or by other appropriate means, such as the application of heat.

The collector B is then moved along its selected path into register with an assembly area 92 for the front end sub-assembly 26, see FIG. 1, where, by means of the winches 163, the arresting frame 160 is swung upwardly out of the way, and the front end sub-assembly 26 is attached, for example, by means of rivets through matching flanges in a well known manner onto the front end of the assembled floor, side wall, and roof sub-assemblies. The rear seat 78 also is installed, and sealed to the side walls and floor.

The rear wheel and power drive unit 24, see FIG. 1, and front wheel sub-assembly 25, which have been completed in their respective assembly areas 91 and 93, are then rolled into position on the wheel tracks 107 and 108 of the collector beneath the bus body D, see FIG. 7, formed by the assembly of the floor side wall, roof and front end assemblies as described previously herein. The bus body D is then lowered in guided relation onto the front and rear wheel sub-assemblies 25 and 24 and secured thereto, for example, as explained in U.S. Pat. application Ser. No. 594,828, now U.S. Pat. No. ,992,846 mentioned previously herein. This operation substantially completes the bus, with the exception of usual skirtings 127 and snapon top-to-side wall fairing extrusions 86, see FIGS. 1 and 18, which latter preferably are of the general type disclosed in U.S. Pat. No. 3,740,089 to T. C. Schuback and assigned to the assignee of the present invention.

The completed bus as shown in FIG. 2, and in broken lines in FIG. 4, may then be rolled out of the collector B, for connection of the various tubes, cables, etc., which preferably are of quick-disconnect or plug-in types, after which the collector is returned to its starting point, and the cycle repeated as set forth herein.

The invention provides a greatly improved manufacturing mechanism and method for making transit vehicles. While the illustrations and descriptions herein are directed specifically to the making of a bus, the invention is also usable for producing other types of transit vehicles, for example, rail cars, people movers, etc.

Having thus described the invention, what is claimed as new and useful and desired to be secured by United States Letters Patent is:

1. Mechanism for assembling, in relative positions of final assembly, a selected plurality of sub-assemblies, each of said sub-assemblies comprising a major component of a transit vehicle and being respectively a floor assembly, a roof assembly and a left and right sidewall assembly, said mechanism comprising:

a collector in the form of a framework of a rectangular shape to receive therein the body of a transit vehicle, said framework being open on at least one end thereof to receive the various sub-assemblies of a transit vehicle to be assembled therein;

said framework having at least a plurality of transverse open frames each having upright side beams, a transverse top beam, and a transverse bottom beam;

said framework being mounted on wheels aligned transversely with respect to the open end of the collector so that the collector can travel between individual staging points where the different sub-assemblies may be loaded into the open end of the collector for assembly of a vehicle within the collector;

floor sub-assembly conveyor way means positioned within said collector framework to convey into said collector and to support therein in relative position of final assembly a floor sub-assembly, said floor sub-assembly conveyor way means being attached to the upright side beams of said transverse open frames, said sub-assembly conveyor way means being of a length approximating that of a vehicle floor assembly;

sidewall sub-assembly conveyor way means positioned within said collector framework to convey into said collector and support therein in relative position of final assembly sidewall sub-assemblies;

roof sub-assembly conveyor way means positioned within said collector framework to convey into said collector and support therein in relative position of final assembly roof sub-assemblies, and means attaching said sidewall sub-assembly conveyor way means and said roof sub-assembly conveyor way means to said collector framework.

2. Transit vehicle assembly mechanism as recited in claim 1 wherein said floor sub-assembly conveyor way means comprises a pair of laterally spaced beams of a length aproximating that of a vehicle floor sub-assembly;

relatively interposed and in spaced relation along the inwardly facing sides of said beams are mounted a plurality of conveyor way support rollers and a plurality of spring biased guide rollers, said conveyor way support rollers functioning to contact horizontally extending structure along the lateral sides of a vehicle floor sub-assembly for the purpose of supporting said sub-assembly, said guide rollers functioning to contact vertically extending structure along the lateral sides of a vehicle floor sub-assembly and aid in guiding the vehicle floor sub-assembly as it is loaded into said collector.

3. Transit vehicle assembly mechanism as recited in claim 2 further comprising means for laterally moving said floor sub-assembly conveyor way means into and out of supporting contact with a vehicle floor sub-assembly.

4. Transit vehicle assembly mechanism as recited in claim 3 wherein said means for laterally moving said floor assembly conveyor way means comprises a plurality of swing out support frames each having one of their ends pivotally attached to said floor assembly conveyor way beam and their opposite ends pivotally attached to said upright side beams of said transverse open frames.

5. Transit vehicle assembly mechanism as recited in claim 4 wherein said means for laterally moving said floor sub-assembly conveyor way means further comprises means for locking said floor sub-assembly conveyor way means in numerous positions of laterally deployment.

6. Transit vehicle assembly mechanism as recited in claim 1 wherein one end of said collector framework is provided with arresting means for arresting each of said vehicle sub-assemblies as each of said selected sub-assemblies is conveyed to a position within said collector for final assembly.

7. Transit vehicle assembly mechanism as recited in claim 1 wherein said sidewall sub-assembly conveyor way means comprises a pair of laterally spaced beams of a length approximating that of a vehicle sidewall sub-assembly, a plurality of conveyor way support rollers are mounted in spaced relationship alon the inwardly facing sides of said beams, said conveyor way support rollers functioning to contact horizontally extending structure along the lateral sides of a vehicle sidewall sub-assembly for the purpose of supporting said sub-assembly.

8. Transit vehicle assembly mechanism as recited in claim 7 wherein said sidewall sub-assembly conveyor way means further comprises means for axially adjusting said conveyor way support rollers in a horizontal direction.

9. Transit vehicle assembly mechanism as recited in claim 7 further comprising means for vertically adjusting the height of the beams of said sidewall sub-assembly conveyor way means.

10. Transit vehicle assembly mechanism as recited in claim 7 wherein said roof sub-assembly conveyor way means comprises a plurality of cross members that are connected to the upwardly facing sides of the pair of laterally spaced beams of said sidewall sub-assembly conveyor way means, said cross members having roof sub-assembly conveyor support rollers extending downwardly from their bottom surfaces.

11. Transit vehicle assembly mecanism as recited in claim 10 further comprising means for vertically adjusting the height of the roof sub-assembly conveyor way rollers.

12. Transit vehicle assembly mechanism as recited in claim 10 wherein said cross members have means for adjusting their length whereby the lateral distance apart of the roof sub-assembly conveyor way rollers and the lateral distance apart of the sidewall sub-assembly conveyor way rollers can be varied.

13. Transit vehicle assembly mechanism as recited in claim 1 further comprising alternate floor sub-assembly support means that are attached to the upright side beams of said transverse open frames and they are utilized to clear the sides of a floor sub-assembly of interferring support structure so that the sidewall sub-assemblies can be connected to the floor sub-assembly.

14. Transit vehicle assembly mechanism as recited in claim 13 wherein said alternate floor sub-assembly comprises a pair of laterally spaced beams of a length approximating that of a vehicle floor assembly, these beams being pivotally attached to opposing upright side beams of the transverse open frames by walking-beam-type lever arms.

15. Transit vehicle assembly mechanism as recited in claim 1 further comprising a pair of spaced vehicle wheel tracks mounted transversely across the bottom beams of said transverse open frames for driving the vehicle out of the collector once the sub-assemblies are connected to each other.

* * * * *